United States Patent
Schnabel et al.

(10) Patent No.: US 11,621,857 B2
(45) Date of Patent: Apr. 4, 2023

(54) FINGERPRINT AND PROVENANCE FOR MOVABLE STORAGE DEVICES

(71) Applicant: Seagate Technology LLC, Fremont, CA (US)

(72) Inventors: Dieter P. Schnabel, Erie, CO (US); Francois Xavier Hannedouche, Paris (FR); Nicholas James Dance, Boulder, CO (US); Ujjwal Lanjewar, Pune (IN); John Anthony Fletcher, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 397 days.

(21) Appl. No.: 17/011,180

(22) Filed: Sep. 3, 2020

(65) Prior Publication Data

US 2022/0070007 A1    Mar. 3, 2022

(51) Int. Cl.
 *H04L 9/32* (2006.01)
 *H04L 9/06* (2006.01)
 *H04L 9/08* (2006.01)

(52) U.S. Cl.
 CPC .......... *H04L 9/3249* (2013.01); *H04L 9/0643* (2013.01); *H04L 9/088* (2013.01); *H04L 9/3242* (2013.01)

(58) Field of Classification Search
 CPC .................................................... H04L 9/3249
 See application file for complete search history.

(56) References Cited

U.S. PATENT DOCUMENTS

| | | | |
|---|---|---|---|
| 5,809,144 A * | 9/1998 | Sirbu | G06Q 20/123 705/75 |
| 7,711,702 B2 | 5/2010 | Smolen et al. | |
| 7,711,703 B2 | 5/2010 | Smolen et al. | |
| 7,783,596 B2 | 8/2010 | Smolen et al. | |
| 7,792,791 B2 | 9/2010 | Smolen et al. | |
| 8,087,063 B2 | 12/2011 | Martin et al. | |
| 8,214,336 B2 | 7/2012 | Cohen et al. | |
| 8,726,351 B2 | 5/2014 | Metzer et al. | |
| 10,310,824 B2 | 6/2019 | Eksten et al. | |
| 10,361,853 B2 | 7/2019 | Castagna et al. | |
| 10,509,684 B2 | 12/2019 | Florissi et al. | |
| 10,515,409 B2 | 12/2019 | Creighton, IV et al. | |
| 10,530,859 B1 | 1/2020 | Todd | |
| 10,554,634 B2 | 2/2020 | Bowman et al. | |
| 10,572,684 B2 | 2/2020 | LaFever et al. | |
| 10,594,484 B2 | 3/2020 | Rodriguez et al. | |
| 10,601,597 B2 | 3/2020 | Callan et al. | |
| 10,666,426 B2 | 5/2020 | Roets | |
| 11,223,608 B2 * | 1/2022 | Bartolucci | H04L 63/0478 |

(Continued)

FOREIGN PATENT DOCUMENTS

EP    1862925 A2    12/2007

*Primary Examiner* — Ponnoreay Pich
(74) *Attorney, Agent, or Firm* — Westman, Champlin & Koehler, P.A.

(57) ABSTRACT

A method includes importing an object into a first data storage device, obtaining static metadata relating to the object, and obtaining dynamic metadata relating to the importation of the object. The static metadata and the dynamic metadata are hashed to create a block hash for the object and the importation of the object. The imported object and the block hash are stored in the first data storage device.

20 Claims, 7 Drawing Sheets

(56) References Cited

U.S. PATENT DOCUMENTS

| | | | |
|---|---|---|---|
| 2006/0010327 A1* | 1/2006 | Koshy | H04L 9/0643 |
| | | | 713/181 |
| 2007/0260476 A1 | 11/2007 | Smolen et al. | |
| 2007/0260575 A1 | 11/2007 | Robinson et al. | |
| 2007/0260620 A1 | 11/2007 | Smolen et al. | |
| 2007/0260621 A1 | 11/2007 | Smolen et al. | |
| 2007/0271258 A1 | 11/2007 | Martin et al. | |
| 2007/0283417 A1* | 12/2007 | Smolen | G06F 16/2308 |
| | | | 726/2 |
| 2008/0005194 A1 | 1/2008 | Smolen et al. | |
| 2008/0072290 A1 | 3/2008 | Metzer et al. | |
| 2017/0033932 A1* | 2/2017 | Truu | H04L 63/102 |
| 2019/0158594 A1* | 5/2019 | Shadmon | H04L 67/01 |
| 2019/0197534 A1 | 6/2019 | Alastair | |
| 2019/0319796 A1* | 10/2019 | Ghosh | H04L 9/3239 |
| 2020/0045020 A1 | 2/2020 | Soundararajan et al. | |
| 2020/0110728 A1 | 4/2020 | Semenov et al. | |
| 2020/0134065 A1 | 4/2020 | Wolfson et al. | |
| 2020/0136809 A1* | 4/2020 | Newman | H04L 9/0643 |
| 2020/0159891 A1 | 5/2020 | Patel et al. | |
| 2020/0250174 A1* | 8/2020 | Padmanabhan | H04L 67/10 |
| 2022/0070007 A1* | 3/2022 | Schnabel | H04L 9/0643 |

\* cited by examiner

FIG. 7

FINGERPRINT AND PROVENANCE FOR MOVABLE STORAGE DEVICES

SUMMARY

In one embodiment, a method includes transferring an object into a first data storage device, and obtaining dynamic metadata relating to the transferring of the object. The dynamic metadata and a previous hash value are hashed to create a block hash for the object and the transferring of the object. The transferred object and the block hash are stored in the first data storage device.

In another embodiment, a non-transitory computer-readable storage medium includes instructions that cause a data storage device to import an object into the data storage device, obtain static metadata relating to the object, and obtain dynamic metadata relating to the importation of the object. The non-transitory computer-readable storage medium includes further instructions that cause the data storage device to hash the static metadata and the dynamic metadata to create a block hash for the object and the importation of the object, to store the imported object in the data storage device and store the block hash in a metadata block on the data storage device, and to send the block hash, the static metadata, and the dynamic metadata to an external secure storage location.

In another embodiment, a method includes importing an object into a first data storage device, and generating a fingerprint for the object, the fingerprint constituting a portion of metadata of the object, and the fingerprint including identification information of the first data storage device. The object and the metadata are stored in memory locations in the first data storage device. A proof related to the fingerprint, without the object, is sent for storage in a central repository.

This summary is not intended to describe each disclosed embodiment or every implementation of fingerprinting and provenance for movable storage devices as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the present disclosure provide methods for capturing provenance and metadata on a mobile storage platform which includes provenance and fixity information.

In general, embodiments of the disclosure relate to a technique for ensuring that an object, which may include a collection of data files, is not tampered with when moving from, for example, one data storage device to another data storage device. The technique is especially suited for an ecosystem of storage devices that need to collaborate to securely and reliably orchestrate the movement of large datasets from remote content creation devices and business sites to private and public clouds.

In one example, a large dataset is stored in a data capture device at a content creation location (e.g., a movie studio). At the content creation location or another location, the data capture device is connected to a first intelligent data storage device, which imports the large captured dataset or object from the data capture device. In an embodiment of the disclosure, while carrying out the importing and storing of the object, the first intelligent data storage device generates a fingerprint (e.g. a cryptographic hash) of the object. The fingerprint includes information related to the object and identification information for the first intelligent data storage device. In the intelligent data storage device, the fingerprint is stored in a different location than the object. For example, if the object is stored in a first memory location, the fingerprint is stored in a second memory location along with other metadata of the object. Also, in this embodiment, information related to the fingerprint, referred to herein as a proof, is sent by the first intelligent data storage device to a central repository. The object is not sent to the central repository. The first intelligent data storage device may then be physically transported to a different location for a data transfer operation to be carried out.

At the different location, the first intelligent data storage device may be connected to a second intelligent data storage device (e.g., an edge cloud device) to carry out the data transfer. As part of the data transfer operation, the object from the first intelligent data storage device is validated using the fingerprint from the metadata in the first intelligent data storage device and the proof from the central repository. When the object is found to be valid, the fingerprint information is enhanced to reflect that the object has been transferred from the first intelligent data storage device to the second intelligent data storage device. In the second intelligent data storage device, the enhanced fingerprint is stored in a different location than the object. For example, if the object is stored in a third memory location (e.g., in the second data storage device), the enhanced fingerprint is stored in a fourth memory location along with other metadata of the object, in the second data storage device. Also, an enhanced proof, related to the enhanced fingerprint, is sent by the second intelligent data storage device to the central repository. Thus, data integrity and a chain of custody of the object are maintained.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse,"

"clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

In one embodiment, imported information, such as an object or the like, onto a mobile storage device, will trigger a capture of a fingerprint of the individual objects. An initial hash is also generated for the actual object. Another hash is generated using the initial hash and dynamic metadata related to the action taken on the object. This is all combined into a hash tree (e.g., a Merkle tree). Imported information is aggregated by creating a hash of individual object hashes. As data is moved from one device to another, a new node is added to object metadata which signs the previous entry and generates a new hash taking into account the new dynamic metadata for the operation performed on the data and/or the move of the data to a new device. The provenance using the hashes is replicated to an external secure portal which stores the root hashes for validation as the mobile devices or objects thereon are moved from location to location or device to device. The data is then validated as it is copied from device to device.

Embodiments of the disclosure address data provenance and validation of data integrity as data is moved from device to device. By incorporating public key infrastructure (PKI) certificates on each device a bundle of data can be assigned a level of trust and validated against a central repository of metadata.

Embodiments of the disclosure provide fingerprint and provenance at the individual object level which is aggregated to bundles. The fingerprint and provenance allow for detection of any data integrity issues using a hierarchical hash structure.

As an object is read from a source location, the object is hashed as it is copied to the new location (e.g., a mobile storage device). The information about the object is stored separately from the object, as metadata. The metadata contains the object's cryptographic hash. This serves as the initial node in a chain of nodes used to copy the data to other storage devices. The initial object metadata is static metadata. That is, once the initial object metadata is determined, that metadata should remain static throughout an entire process of moving the object from one device to another, from one location to another, or both. As each step of movement of transfer occurs, new dynamic metadata is generated, such as for identifying the action, source and destination locations and devices, and the like. The static metadata remains the same.

The dynamic metadata and previous hash is hashed and that information is then sent in summary form to a remote system for storage and serves as a separate validation source. It is also entered as a block hash for the current device, and is signed using a sign function. A current block hash is provided to a new device or for a new action on the object in order to provide a previous hash for the generation of a new hash of the previous hash and new dynamic metadata, and so forth.

Figure 1:
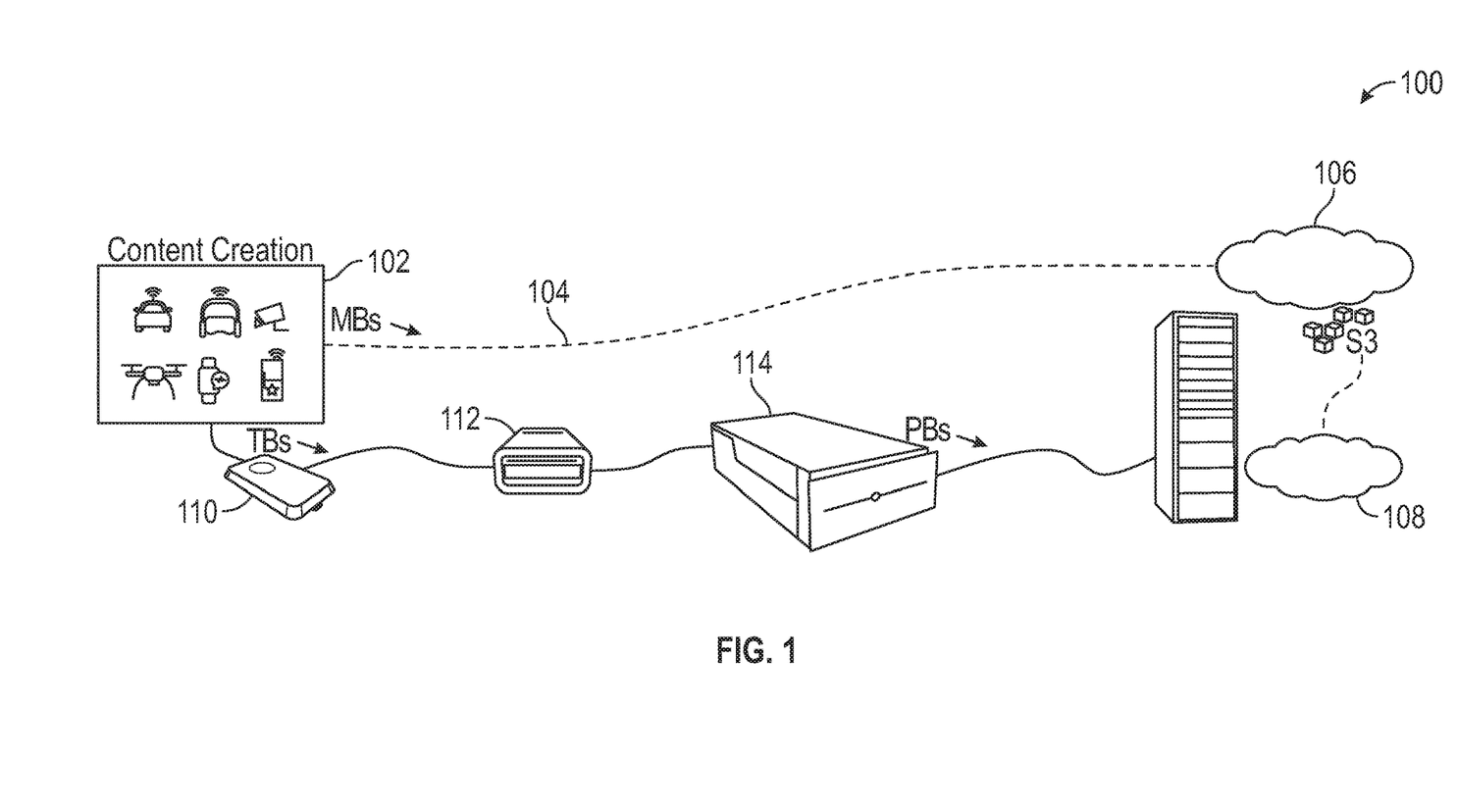
FIG. 1 is a block diagram illustrating an ecosystem of devices on which embodiments of the present disclosure may be employed.

FIG. 1 is a diagram of a representative ecosystem 100 of secure devices through which an object or other content travels. Some amount of content may be small, and readily transmissible over a network, such as a wireless network 104 that allows transmission of content 102 to a public cloud server 106, and from the public cloud server 106 to a private cloud server 108. However, large datasets and objects, for example those generated by surveillance systems or other systems that generate large amounts of data, cannot efficiently or quickly transfer what may be terabytes or even petabytes of information over wireless or wide-area/public networks. In such situations, a series of data capture and storage devices may be used to transfer large data sets from one location to another.

FIG. 1 shows data capture device 110 on which content 102, such as objects or large datasets may be stored. Data capture device 110 is used in one embodiment to physically transfer its stored information to a data shuttle 112. Multiple data capture devices 110 may be used to physically store information onto a single data shuttle 112 in one embodiment. One or more data shuttles 112 are used in one embodiment to physically transfer its, or their, stored information to a larger device such as edge cloud 114. Multiple edge cloud devices 114 may be used to physically store information onto the private cloud 108. By the time a number of large datasets or objects are stored onto an edge cloud device 114, petabytes of information may be involved.

Data integrity and security are maintained in one embodiment by using a plurality of authenticated secure devices 110, 112, and 114 for transfer of information from a content creation site to private cloud 108. One such ecosystem 100, as is shown in FIG. 1, comprises an ecosystem of networked intelligent storage devices and software that collaborate to securely and reliably orchestrate the movement of large datasets from remote content creation devices and business sites 102 to private and public clouds 106 and 108 respectively.

Figure 2:
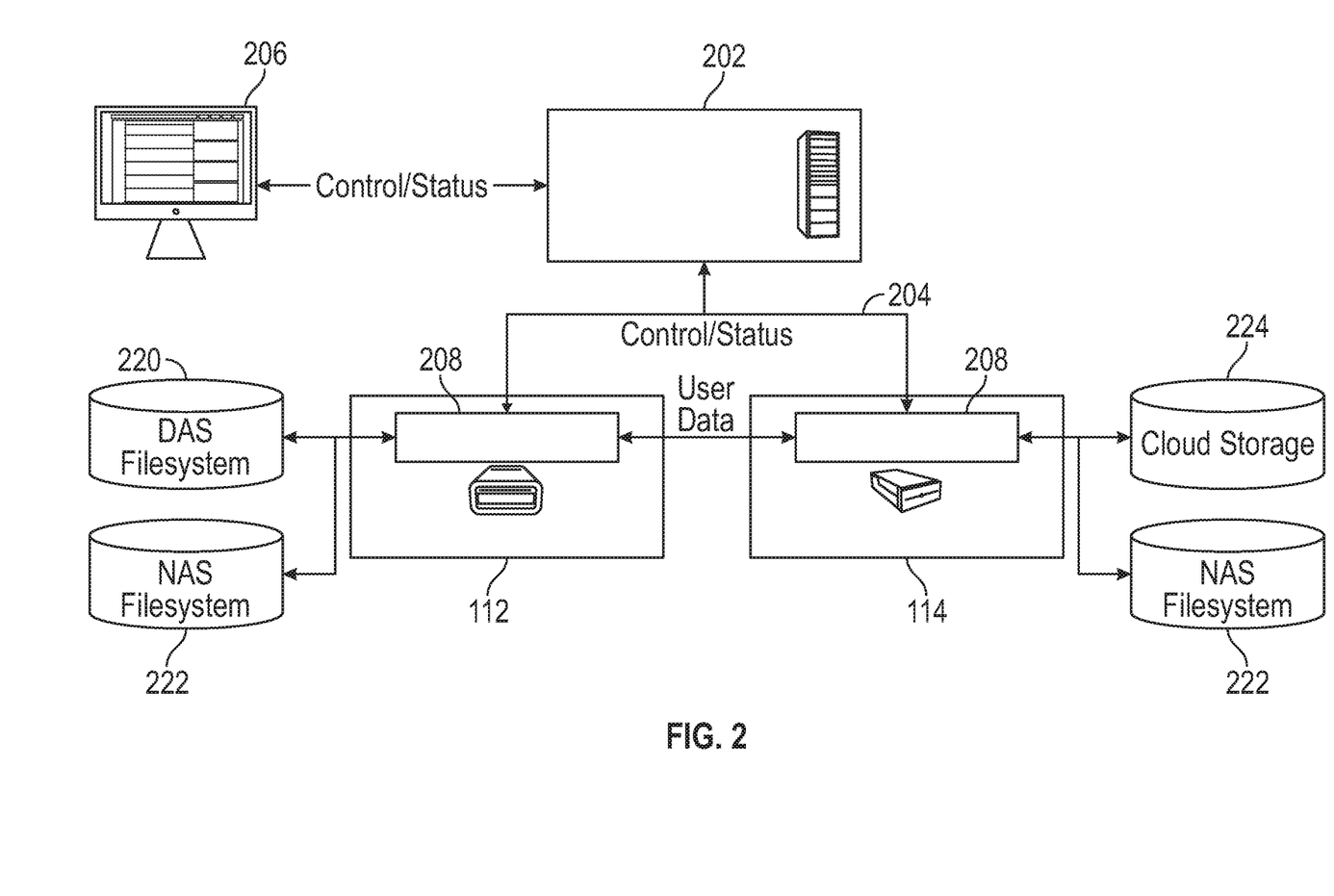
FIG. 2 is a block diagram illustrating system components according to an embodiment of the present disclosure.

Further detail of a system 100 such as that shown in FIG. 1 are shown in FIG. 2. In one embodiment, a central repository 202 is used for storage of metadata information related to stored data and devices that is generated on a network of interconnected devices. The repository 202 is accessed, for example, as a cloud service or on locally administrated information technology (IT) infrastructure. External interactions with the ecosystem are performed in one embodiment via an application programming interface (API) 204, which is in one embodiment made available to external automation software and clients. The API 204 manages the orchestration of data through the ecosystem but does not participate in the activity of data movement itself. Instead, the API 204 allows access to the metadata information, stored at the repository 202, that is related to the movement of the data and objects through the system 100.

Another interaction with the ecosystem may use a web application 206 that acts as a central point of management and control of the ecosystem. In one embodiment, the web application 206 provides the ability to control data orchestration services as well as administer, track and manage connected devices. The application 206 may be deployed as a cloud service or on locally administrated IT infrastructure. The application 206 may further be used by end-users for controlling and managing orchestration services for the ecosystem and the devices thereon via desktop or mobile web browsers. Devices and services are accessed through the application 206 and/or the API 204.

In one embodiment, devices (e.g., 110, 112, 114 of FIG. 1) are secure known devices for storing and transporting user data. Within an ecosystem of such an embodiment, all the devices are trusted and known devices. The devices in one embodiment run agent software 208 that provides a way for the central repository 202 to remotely view device status and data inventory as well as perform orchestration actions.

The agent software 208, is, in one embodiment the software responsible for securely performing data orchestration commands instigated by the central repository 202. The primary orchestration primitives that software 208 performs include import, copy, delete, and export commands. The import command imports user data from non-ecosystem storage devices into the ecosystem. The copy command transfers user data between ecosystem storage devices. The delete command deletes imported user data from an ecosystem device. The export command exports user data from the ecosystem to an external storage device.

Software 208 runs on intelligent ecosystem enabled devices (e.g., devices 110, 112, 114 of FIG. 1) and connects to the central repository 202 remotely via public or private networks. When offline, software 208 also supports policy driven automation tasks and control from user interfaces embedded within the devices themselves, such as an electronic ink (E-Ink) display.

The external storage devices to the ecosystem 100 of FIG. 1 act as sources for data import and destinations for data export. Examples of external storage devices that can be used as sources or destinations for objects/files within the ecosystem 100 of FIG. 1 include, by way of example only and not limitation, direct attached storage (DAS) 220, such as universal serial bus (USB) flash, memory cards, hard disk drives (HDDs), solid state drives (SSDs), and hybrid drives; network attached storage (NAS) 222 such as network file system (NFS) shares; and cloud object storage 224 such as Amazon simple storage service (Amazon S3) buckets. The software 208 does not track or manage data that resides on these devices. Data is tracked and managed once it enters the ecosystem 100 of FIG. 1.

Managing the ecosystem and the transfer of files within the system is accomplished according to another embodiment of the present disclosure. In that embodiment, shown in block diagram in FIG. 3, a metadata log is created for maintaining provenance and data integrity for transfer of an object/dataset either within an ecosystem, or in a hybrid system of secure ecosystem devices and non-secure devices.

Figure 3:
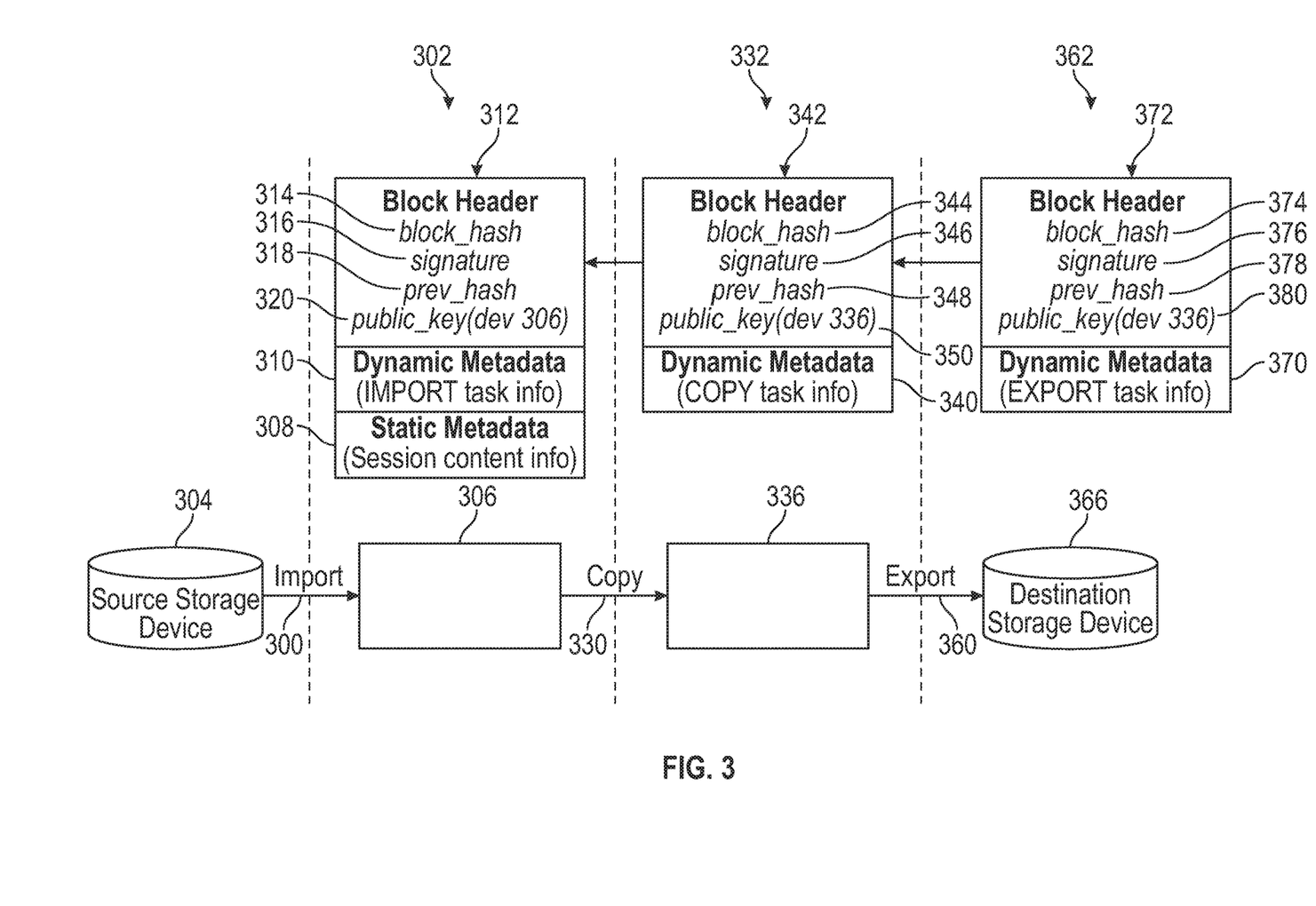
FIG. 3 is a diagram of metadata collection and storage according to an embodiment of the present disclosure.

The first block entry 302 of a metadata log block chain is created on the import of data (shown as arrow 300) from a non-ecosystem device 304 to an ecosystem device 306. This action causes the device 306 to allocate a new import session identifier (ID) for the imported data, calculate the static metadata 308 for each object and generate a dynamic metadata entry 310 and a task ID describing the import action itself. The session ID remains the same for the lifetime of the data. A task ID is created for each subsequent action on the data. This information is added to the first entry of the block chain where it is fingerprinted and signed using the private domain-device key of the device (described elsewhere herein). The block 302 contains a header 312 that includes the fingerprint/hash 314 of the block entry, a signature 316 for the block entry derived from the block fingerprint, a certificate 320 (e.g., an X.509 certificate) corresponding to the key used to create the signature, a date-time stamp for when the entry was created (not shown), and a fingerprint/hash 318 of the previous entry in the block chain. The block fingerprint included in the header 312 is calculated over all content of the block with the exception of the hash and signature fields (314 and 316). For the first entry in the chain, a previous block fingerprint 318 is not available, so this value is set to 0.

The certificate 320 in the block entry header 312 provides the public key for validating the signature 316 as well as providing the information required to establish that the device that signed the entry was a valid member of the ecosystem domain.

Static metadata in one embodiment is recorded for each object imported by the import session as well as for the overall import session itself in the form of a manifest. Static metadata contains information on the objects at the point they were imported, such as filesystem attributes, e.g. filename, owner, modified time, permissions, size, etc.; a data fingerprint for object; an inventory of objects contained in the session; and an import Session ID.

Dynamic metadata is recorded (as a task ID) on an object for every operation performed on it. The goal of dynamic metadata determination is to capture a log of actions performed on the session to provide traceability for provenance purposes. Dynamic metadata also tracks all metadata manipulations performed on the session, such as adding user defined tags after the initial import. Examples of dynamic metadata fields include parameters of actions being performed on a session/object; a task ID; a task type (IMPORT, EXPORT, COPY, etc.); source device and volume; destination device and volume; ID of the device performing the action; any problems detected with data or metadata consistency detected during the operation; any problems detected with the chain of provenance; and tags added post import.

For each action performed on the data after the initial import, a new block entry is added to the chain by the device performing the operation. These follow-on entries only contain dynamic metadata as the static data does not change after the initial import and can be retrieved from the first block chain entry 302.

The process of extending the block chain is shown generally for second and third actions in FIG. 3. In the second action, the imported object is copied (shown as arrow 330) to device 336, also a part of the ecosystem. The second block entry 332 of a metadata log block chain is created on the copy of data (shown as arrow 330) from device 306 to an ecosystem device 336. This action causes the device 336 to allocate a new copy task ID for the copied data, and generate a dynamic metadata entry 340 describing the copy action itself. This information is added to the entry 332 of the block chain where it is fingerprinted and signed using the private domain-device key of the device (described elsewhere herein). The block 332 contains a header 342 that includes the fingerprint/hash 344 of the block entry, a signature 346 for the block entry derived from the block fingerprint, a certificate 350 (e.g., an X.509 certificate) corresponding to the key used to create the signature, a date-time stamp for when the entry was created (not shown), and a fingerprint/hash 348 of the previous entry in the block chain, in this case hash 318. The block fingerprint included in the header 342 is calculated over all content of the block with the exception of the hash and signature fields (344 and 346).

The certificate 350 in the block entry header 342 provides the public key for validating the signature 346 as well as providing the information required to establish that the device that signed the entry was a valid member of the ecosystem domain.

In the third action, the object from device 336 is exported (shown as arrow 370) to destination storage device 366. The third block entry 362 of a metadata log block chain is created on the export of data (shown as arrow 360) from device 336 to destination storage device 366. This action causes the device 366 to allocate a new export task ID for the exported data, and generate a dynamic metadata entry 370 describing the export action itself. This information is added to the entry 362 of the block chain where it is fingerprinted and signed using the private domain-device key of the device (described elsewhere herein). The block 362 contains a header 372 that includes the fingerprint/hash 374 of the block entry, a signature 376 for the block entry derived from the block fingerprint, a certificate 380 (e.g., an X.509 certificate) corresponding to the key used to create the signature, a date-time stamp for when the entry was created (not shown), and a fingerprint/hash 368 of the previous entry in the block chain, in this case hash 348. The block fingerprint included in the header 372 is calculated over all content of the block with the exception of the hash and signature fields (374 and 376). The certificate 380 in the block entry header 372 provides the public key for validating the signature 376.

Although every effort is made to only include trusted devices within an ecosystem, it should be understood that if a rogue device was to be accepted, it would be possible for that device to manipulate the session data and rewrite the entire block chain to validate against the manipulated data. A device receiving the metadata and data from just that one rogue device would accept it as valid. In one embodiment, to guard against this, an ecosystem device may use more than one source for the session metadata and compare the chain of provenance between the two for common ancestors as part of validation. If no common ancestors are found in the chains, then the import session may be quarantined until it can be validated by a user.

One such alternative source for the metadata is the central repository 202 of FIG. 2 described herein, which in one embodiment is provided shared copies of the metadata as each device in the chain of custody performs its operations. Provided the rogue device is not the source of the import, cross checking metadata from it and that portal will reveal inconsistencies that may cause the import session to be quarantined. Provision of the metadata for each block of the block chain to the central repository 202 of FIG. 2 is included in one embodiment.

Data fingerprinting is the process of deriving a unique value, typically a hash that represents the content of the data over which it is calculated. If the received data does not correspond to its stated fingerprint, it can be surmised that the data has either become corrupted or has been tampered with. The process of importing data into the ecosystem results in a fingerprint being calculated for it. This fingerprint is then used to validate the consistency of that data on all ecosystem devices until it is finally exported at its destination.

The process of importing data into the ecosystem results in a fingerprint being calculated for each file or object as well as for the metadata describing the import session. This fingerprint is then used to validate the consistency of that data on all ecosystem devices until it is finally exported at its destination.

Although any accepted form of fingerprinting and hashing may be used, in one embodiment, the ecosystem process for calculating fingerprints follows National Institute of Standards and Technology (NIST) recommendations for secure cryptographic hashing using the encryption requirements of Rivest-Shamir-Adleman (RSA) and secure hash algorithm (SHA).

Figure 4:
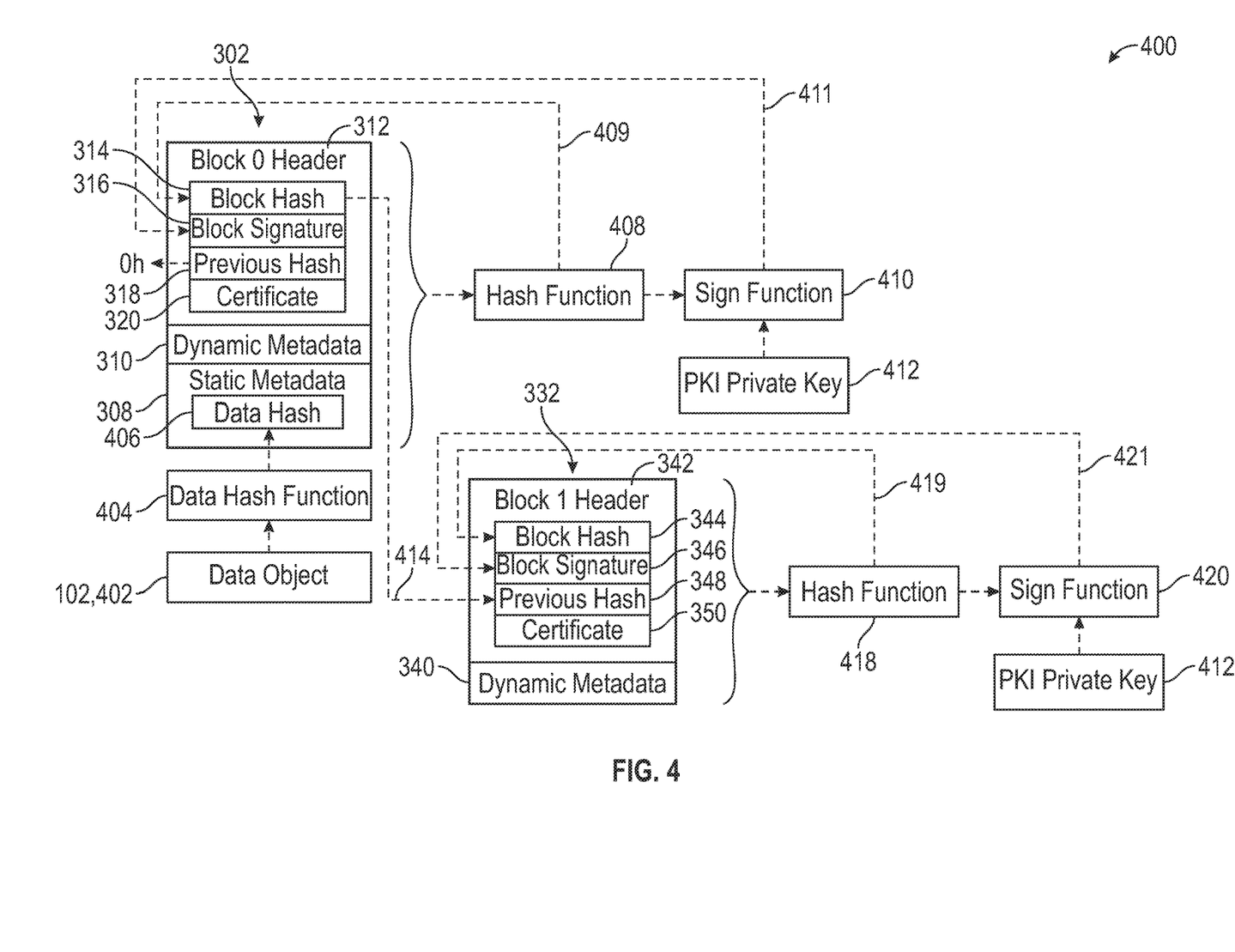
FIG. 4 is a more detailed diagram of the method shown in FIG. 3.

FIG. 4 describes in greater detail an embodiment 400 of metadata structure and its operation, which is used to provide both data object integrity information (fingerprint/hash) and provenance information. That metadata is structured as a metadata log with each entry being referred to as a block. Each action performed upon the data object results in a new block getting appended to the log.

Element 302 represents the first block in a metadata log. This block entry is created when a data object 102, 402 is first imported into the ecosystem. Block 302 (e.g., block 0 of the metadata block chain) contains three main subsections, the block header 312, which contains fields relevant to the metadata log structure itself; the dynamic metadata 310, which contains fields relevant to the activity that was performed to import the data, for example an import operation; and static metadata 308, which contains fields relevant to the actual data object 102, 402 itself. The first block 302 of the metadata log (e.g., block 0) is the only block of the block chain that contains a static metadata section 308.

Element 102, 402 represents the data object that the metadata log structure is being used to protect. Information regarding this object 102, 402, including file system properties, an integrity hash, additional metadata, and user specific tags are contained in this section.

Element 312 represents the block header for block 302. Each block in the metadata log structure includes a block header, which contains the definition of the log structure itself. This header includes four fields to define the block structure, including the block hash 314, the block signature 316, the previous block hash 318, and a certificate (e.g., an X.509 certificate) corresponding to a PKI private key 412 (described elsewhere herein).

Element 314 represents the block hash field. Block hash 314 is a numerical value derived from a cryptographically secure hash function 408, such as a variant of SHA-2, and is stored into the block hash field as shown at arrow 409. The block hash 314 is used to verify validity of the block content. The block hash 314 is calculated from all the bytes contained within the block 302 with the exception of the block hash 314 and the block signature 316 fields. The block hash 314 is used by a reader of the metadata log to validate that the block content is unmodified when applying it to the same 408 and comparing the result.

Element 316 represents the block signature field. The block signature field 316 is an encrypted copy of the block hash 314 that is encrypted using sign function 410 is derived from a PKI public key 412 using a public key cipher, such as RSA, and is stored into the block signature field as shown at arrow 411. The purpose of the block signature 316 is to demonstrate that a trusted device created the metadata log block entry. This is facilitated by providing the certificate 320 corresponding to the PKI key-pair in the block header 312 for verification of the block signature 316 by a reader of the metadata. The certificate 320 is used to a) demonstrate that the device that created the entry is using the PKI private key 412 that is certified by a trusted entity (in one embodiment the ecosystem central repository 202), and b) to provide the public key that can be used to decrypt the block signature 316 and validate it against the value of the block hash 314 and block content.

The hash function 408 is a function, such as an algorithm, used to calculate the block hash 314, for example a variant of SHA-2. The hash function may or may not be the same as the data hash function 404 described below. The block hash 314 is calculated by passing all bytes of the block 302 with the exception of the block hash 314 and the block signature 316 fields through the hash function 408.

The sign function 410 is in one embodiment a function (e.g., a cryptographic algorithm) used to derive the block signature 316 by encrypting the block hash 314 using a PKI private key 412. An example of a cryptographic algorithm used for the sign function 410 is RSA-2048. The PKI private key 412 is the key used to derive the block signature 316 and is known only to the device writing the log entry. The PKI key-pair to which the PKI private key 412 belongs is authenticated with a certificate (e.g., an X.509 certificate) that issued by a trusted authority (in one embodiment the central repository 202 of FIG. 2). The block signature 316 can be decrypted by the public key provided by the certificate, and by that decryption, demonstrates that the device to which the certificate was issued wrote the block entry, provided the PKI private key 412 is not compromised.

As described above, once the block hash, block signature, and dynamic metadata (as well as the static metadata for the first block) are determined and stored, the metadata is in one embodiment sent to a central repository, such as repository 202, so that later functions may use the securely stored metadata to further verify integrity and provenance of the object 102, 402 as it moves within the ecosystem.

Element 318 represents the previous hash field. This field 318 acts as a reference to the previous block entry in the metadata log. As the content of this field 318 is included in the calculation of the block hash 314 and block signature 316, it can be used to verify that the log structure has not been tampered with by either a) inserting blocks, b) removing blocks, or c) reordering blocks. The previous hash field 318 for the first block 302 of the block chain for the metadata log is set to 0, since there are no previous hashes. Each subsequent block previous hash entry has this value set to the same value as the block hash for the previous block in the log. For the system of FIG. 4, a second block 332 in the metadata log has block hash 314 assigned to the previous hash field 348, as shown at arrow 414.

Element 310 represents the dynamic metadata subsection. The dynamic metadata 310 contains information that describes the action that created the log block entry. For example, the dynamic metadata 310 may include, for example, one or more of the task type (IMPORT, COPY, EXPORT, TRUST, etc.), the identity of the source device for where the data object 201, 402 originated, the identity of the destination device for where the data object 102, 402 was stored, the time and date on which the action occurred, and the result of the action. Every block entry in the metadata log determines its dynamic metadata.

Element 308 represents the static metadata subsection. The static metadata 308 contains information that describes the data object 102, 402 itself. The static metadata 308 includes a data hash 406, obtained using a data hash function 404. The data hash 406 is used in one embodiment to validate that the data content has not been modified since the original import. Only the first block entry 302 contains a static metadata section 308, as this data does not change over the lifetime of the data object 201, 402 while under ecosystem management.

Element 406, as discussed above, represents the data hash of the data object 102, 402. The data hash 406 is a numerical value derived from a cryptographically secure data hash function 404. Data hash 406 is used by a reader of the metadata to validate that the content of the data object 102, 402 has not been modified since it was originally imported into the ecosystem.

The data has function 404 is a function such as an algorithm used to calculate the data hash 406, for example a variant of SHA-2. The data hash function 404 may or may not be the same as the hash function 408 used to calculate the block hash 314. The data hash 406 is determined by passing all bytes of the data object 102, 402 through the data hash function 404.

Block 332 represents the second block in the metadata log. It and any subsequent blocks will appear if more than one operation is performed on the data object 201, 402. The block structure for second and subsequent blocks in the metadata log contain block header and dynamic metadata sections only. A single additional block 332 of the metadata log is shown. It uses a hash function 418 that stores the block hash 344 as shown at arrow 419, and a sign function 420 that encrypts the block hash 344 using the PKI private key 412, and that stores the block signature as shown at arrow 421.

Figure 5:
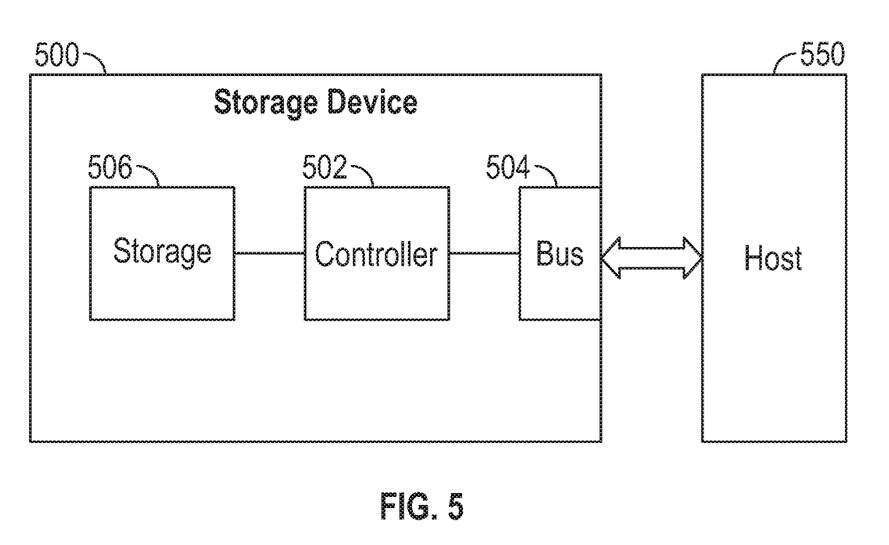
FIG. 5 is a block diagram of a data storage device on which embodiments of the present disclosure may be used.

Referring now to FIG. 5, a simplified block diagram of a storage system 500 on which embodiments of the present disclosure may be practiced is shown. Storage system 500 may be a HDD with platters, a read head, and associated controllers. System 500 may include, by way of example, a controller 502 coupleable via a bus 504 or the like to a host system 550, where the host system 550 may provide power over the bus 504 or through a separate power bus (not shown), and a storage component 506 (such as a spinning disk or platter of disks). A graphics processor may be embodied within the storage device as computer readable instructions thereon for performing graphics processing. Alternatively, a separate graphics processor may be used.

Figure 6:
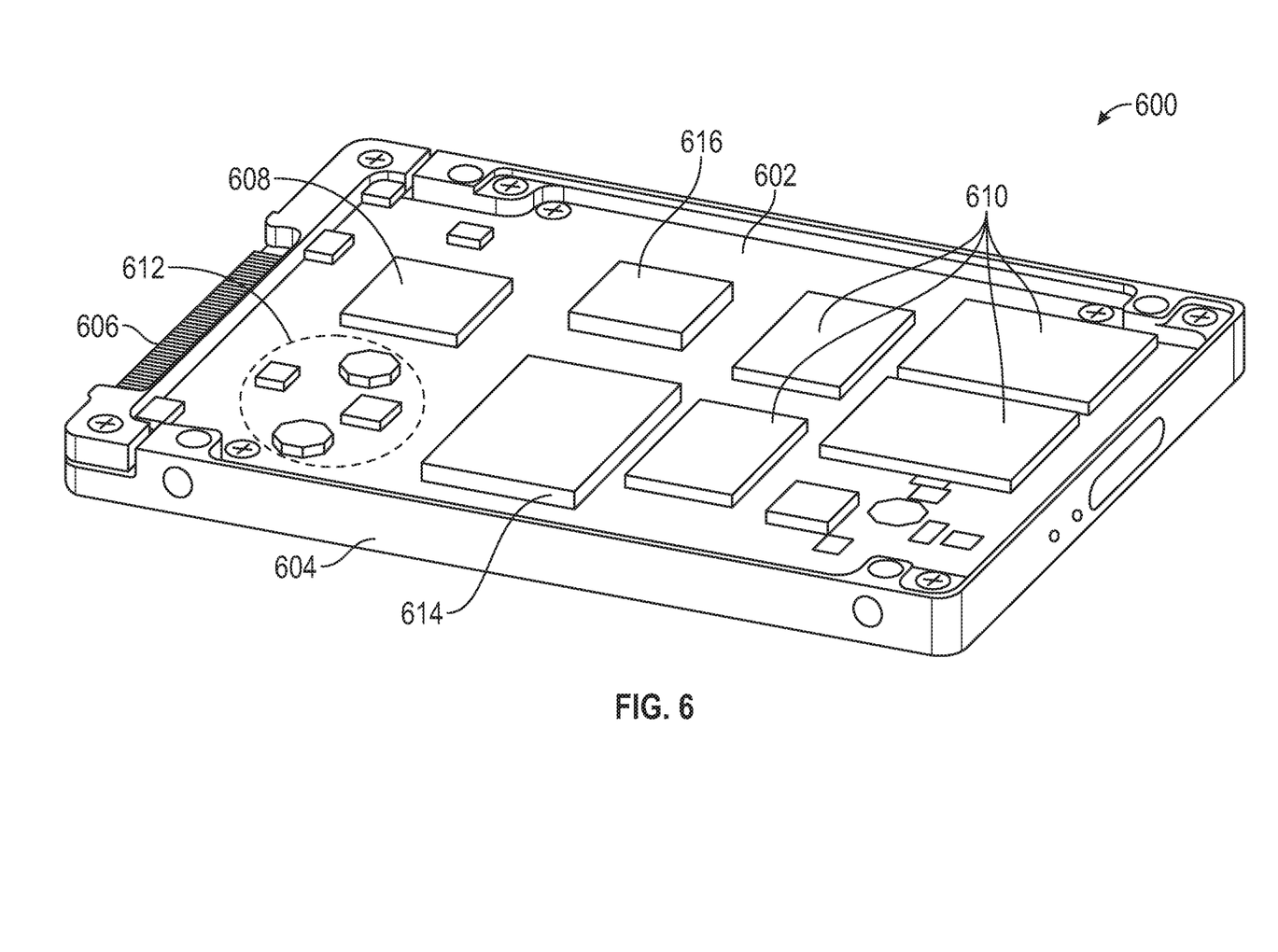
FIG. 6 is an oblique view of a solid state drive (SSD) on which embodiments of the present disclosure may be used.

FIG. 6 illustrates an oblique view of a solid state drive (SSD) 600 in accordance with a system embodying the methods described herein. SSD 600 includes one or more printed circuit boards (PCBs) or circuit card assemblies 602 and typically includes a protective, supportive housing 604, and one or more interface connectors 606. SSD 600 further includes a controller application specific integrated circuit (ASIC) 608 or field programmable gate array (FPGA), one or more non-volatile memory devices 610, and power regulation circuitry 612. The memory devices 610 are essentially the SSD's data storage media. SSD 600 may include erasure blocks as the physical storage locations within memory device 610, which may include Flash memory devices, for example. In some applications, SSD 600 further includes a power-backup energy storage device, such as a super-capacitor 614.

In accordance with certain aspects, the SSD 600 includes the circuit card assembly 602 that includes a connector 606 for connection to a host computer (not shown). In accordance with certain aspects, the connector 606 includes a NVMe (non-volatile memory express), SCSI (small computer system interface), SAS (serial attached SCSI), FC-AL (fiber channel arbitrated loop), PCI-E (peripheral component interconnect express), IDE (integrated drive electronics), AT (advanced technology), ATA (advanced technology attachment), SATA (serial advanced technology attachment), IEEE (institute of electrical and electronics engineers)-1394, USB (universal serial bus) or other interface connector adapted for connection to a host computer. A graphics processor may be embodied within the storage device as computer readable instructions thereon for performing graphics processing. Alternatively, a separate graphics processor may be used.

Figure 7:
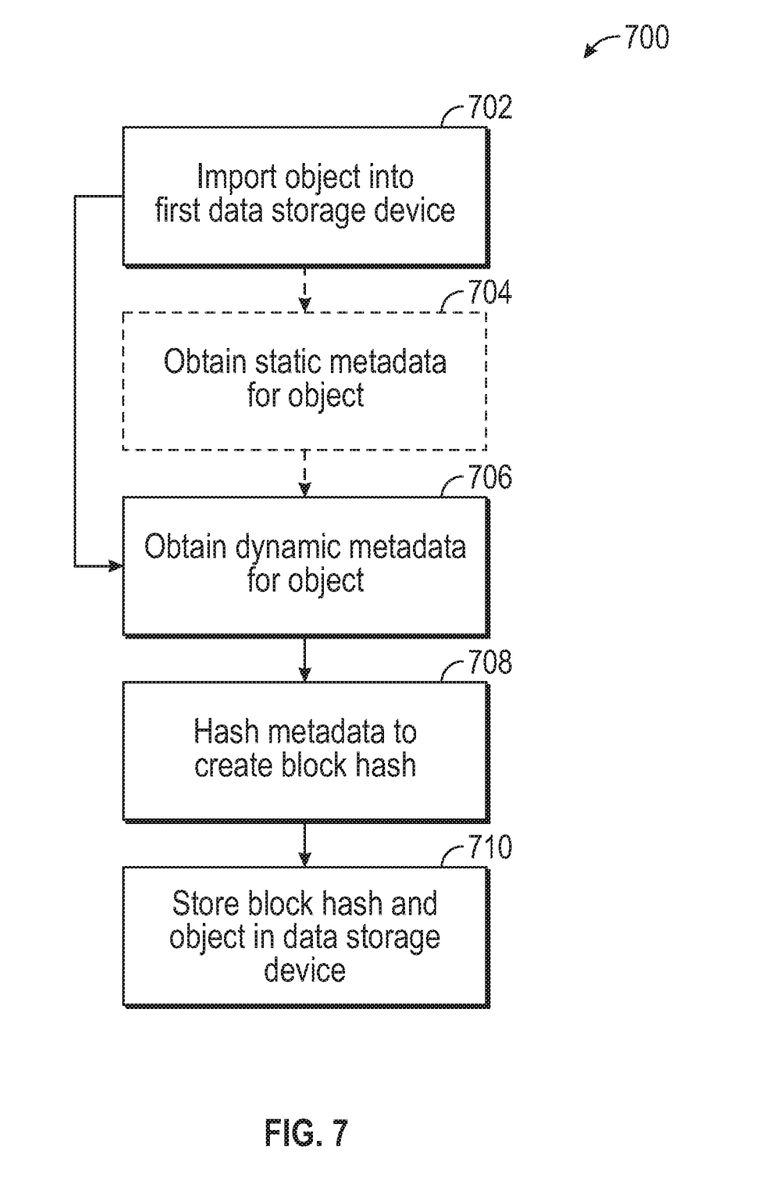
FIG. 7 is a flow chart diagram of a method according to an embodiment of the present disclosure.

FIG. 7 is a flow chart diagram of a method 700 according to an embodiment of the disclosure. Method 700 comprises, in one embodiment, importing (or transferring) an object into a first data storage device in block 702. If the importing is the first instance of bringing the object into an ecosystem, once the object is imported, the method further comprises obtaining static metadata relating to the object in block 704, and obtaining dynamic metadata relating to the importation of the object in block 706. The static metadata, the dynamic metadata, and a previous hash are hashed in block 708 to create a block hash for the object and the importation of the object. The block hash and imported object are stored in the first data storage device in block 710. If the transferring of the object is the first instance, the previous hash is set to 0. If the transferring of the object is within the ecosystem, such as from a first device into which the object was imported, then block 704 is skipped since the static metadata for the object is already present, and the previous hash is set as the hash block from the header for the device which is transferring the object. Optionally, the method 700 may further include sending the static metadata, the dynamic metadata, and block hash to an external secure storage location.

As discussed above, the method may further include signing the block hash using a private key of the data storage device, storing the signed block signature in the first data storage device. The method may also include storing the block hash and the signed block signature in a metadata log in the first data storage device, the metadata log comprising a block header, the static metadata, and the dynamic metadata. A block header for each block of the metadata log may include storage therein for the block hash, the signed block signature, a previous hash set to zero, a certificate corresponding to the private key, and a date and time stamp for when the entry was created.

Upon transfer of the object to a second data storage device, the method may further include transferring the object to a second data storage device, copying the block hash in the block header to a previous hash of a new block header, and storing the previous hash and the object in the second data storage device. The method may further include obtaining, and storing to the second data storage device, dynamic metadata relating to the action performed on the object during the transferring of the object to the second data storage device. The previous hash and the dynamic metadata relating to the action performed on the object during the transferring of the object are hashed to create a new block hash. The copied object and the new block hash are stored in the second data storage device. Optionally, the new block hash and the new dynamic metadata are sent to the external secure storage location. Like the first data storage device, the second data storage device, and all subsequent devices in the chain of custody of the object(s) may sign and hash with a previous hash and dynamic metadata, using the private key as described. Further, the second data storage device and all subsequent devices in the chain of custody may send their block metadata to the central repository, and may retrieve previous metadata stored at the central repository, to aid in verification and provenance of the object and its integrity.

The present disclosure may be embodied in a system, a method, and/or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational processes to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
   transferring an object into a first data storage device;
   obtaining dynamic metadata relating to the transferring of the object;
   hashing the dynamic metadata and a previous hash value to create a block hash for the object and the transferring of the object; and
   storing the transferred object and the block hash in the first data storage device.

2. The method of claim 1, wherein:
   when transferring the object is a first occurrence of a transfer into a secure ecosystem, the method further comprises:
   obtaining static metadata relating to the object; and
   wherein hashing further comprises hashing the static metadata with the dynamic metadata and the previous hash value, and wherein the previous hash value is set to 0.

3. The method of claim 2, and further comprising sending the static metadata, the dynamic metadata, and block hash to an external secure storage location.

4. The method of claim 1, and further comprising:
   signing the block hash using a private key of the data storage device; and
   storing the signed block signature in the first data storage device.

5. The method of claim 4, wherein the block hash and the signed block signature are stored in a metadata log in the first data storage device, the metadata log comprising a block header and the dynamic metadata.

6. The method of claim 5, wherein the block hash, the signed block signature, a previous hash set to zero, a certificate corresponding to the private key, and a date and time stamp for when the entry was created are stored in the block header.

7. The method of claim 5, wherein when transferring the object is a first occurrence of a transfer into a secure ecosystem block header, the metadata log further comprises the static metadata.

8. The method of claim 2, and further comprising:
   copying the object to a second data storage device;
   copying the block hash in the block header to a previous hash of a new block header;
   storing the previous hash and the object in the second data storage device;
   obtaining, and storing to the second data storage device, dynamic metadata relating to the action performed on the object during the transferring of the object to the second data storage device;
   hashing the previous hash and the dynamic metadata relating to the action performed on the object during the transferring of the object to create a new block hash;
   storing the copied object and the new block hash in the second data storage device; and
   sending the new block hash and the new dynamic metadata to the external secure storage location.

9. The method of claim 8, and further comprising:
   signing the new block hash using a private key of the second data storage device; and
   storing the signed new block signature in the second data storage device.

10. The method of claim 9,
    wherein the new block hash and the signed new block signature are stored in a metadata log in the second data storage device, the metadata log comprising a second block header and the dynamic metadata relating to the action performed on the object during the transferring of the object to the second data storage device; and
    wherein the new block hash, the signed new block signature, the previous hash, a certificate corresponding to the private key, and a date and time stamp for when the header entry was created are stored in the second block header.

11. The method of claim 8, and further comprising:
    obtaining the previous hash from the external secure storage location; and verifying that the previous hash received at the second data storage device from the first data storage device and the previous hash obtained from the first data storage device are the same.

12. The method of claim 8, wherein obtaining dynamic metadata comprises obtaining at least one of information that describes the action that created the log block entry, a task type, an identity of the source device for where the object originated, an identity of the destination device for where the object was stored, a time and date on which the action occurred, and a result of the action.

13. A non-transitory computer-readable storage medium including instructions that cause a data storage device to:
import an object into the data storage device;
obtain static metadata relating to the object;
obtain dynamic metadata relating to the importation of the object;
hash the static metadata and the dynamic metadata to create a block hash for the object and the importation of the object;
store the imported object in the data storage device and store the block hash in a metadata block on the data storage device; and
send the block hash, the static metadata, and the dynamic metadata to an external secure storage location.

14. The non-transitory computer-readable storage medium of claim 13, wherein the instructions further cause the data storage device to:
sign the block hash using a private key of the data storage device; and
store the signed block signature in the metadata block on the first data storage device.

15. The non-transitory computer-readable storage medium of claim 14, wherein the instructions further cause the data storage device to store, in a header of the metadata block, the block hash, the signed block signature, a previous hash set to zero, a certificate corresponding to the private key, and a date and time stamp for when the header entry was created, and to store the static metadata and the dynamic metadata in additional sections of the metadata block.

16. The non-transitory computer-readable storage medium of claim 13, wherein the instructions further cause the data storage device to:
transfer the object to a second data storage device;
export the block hash in the block header to a previous hash of a new block header;
store the previous hash and the object in the second data storage device;
obtain and store dynamic metadata relating to the action performed on the object during the transferring of the object to the second data storage device;
hash the previous hash and the dynamic metadata relating to the action performed on the object during the transferring of the object to create a new block hash;
store the imported object and the new block hash in the second data storage device; and
send the new block hash and the new dynamic metadata to the external secure storage location.

17. The non-transitory computer-readable storage medium of claim 16, wherein the instructions further cause the data storage device to:
sign the new block hash using a private key of the second data storage device; and
store the signed new block signature in the second data storage device.

18. The non-transitory computer-readable storage medium of claim 17, wherein the instructions further cause the data storage device to store, in a header of a metadata log on the second data storage device, the new block hash and the signed new block hash signature, and to store the dynamic metadata relating to the action performed on the object during the transferring of the object to the second data storage device in an additional section of the metadata log.

19. The non-transitory computer-readable storage medium of claim 16, wherein the instructions further cause the data storage device to:
obtain the previous hash from the external secure storage location; and
verify that the previous hash received at the second data storage device from the first data storage device and the previous hash obtained from the first data storage device are the same.

20. A method, comprising:
importing an object into a first data storage device;
generating a fingerprint for the object, the fingerprint constituting a portion of metadata of the object, and the fingerprint including identification information of the first data storage device;
storing the object and the metadata in memory locations in the first data storage device; and
sending a proof related to the fingerprint, without the object, for storage in a central repository.

* * * * *